United States Patent Office 2,873,278
Patented Feb. 10, 1959

2,873,278
CERTAIN 4-ACYL-1,2-DIPHENYL-3,5-DIOXOPYRAZOLIDINES

Willy Logemann and Francesco Lauria, Milan, Italy, assignors to Carlo Erba S. p. A., Milan, Italy, a firm No Drawing. Application June 3, 1955
Serial No. 513,148

Claims priority, application Italy June 9, 1954

5 Claims. (Cl. 260—310)

Dioxo-pyrazolidines have a physiological and pharmacological activity similar to that known in literature of pyrazolone. By substituting an alkyl-group in position 4 in dioxo-pyrazolidines, compounds of a good antipyretic activity are obtained.

A strong activity of this kind is also achieved by introducing an acyl-group in position 4.

These compounds have the following general formula:

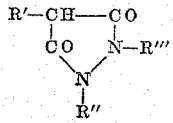

where R′=aliphatic, aromatic, hydro-aromatic and heterocyclic-acyl groups with normal and branched chains; R″=R‴=alkyl, phenyl and substituted phenyl groups.

In respect of antipyrine, acyl-derivatives in position 4 are easily obtained when the compound is heated with an acid chloride. In our case, however, this simple method cannot be used, but special methods are to be employed. It is possible to obtain the acyl-derivative by reacting the acid chloride in pyridine at an elevated temperature, but the yield is very low.

Good yields are obtained by using condensing agents in this synthesis. As condensing agent an aluminum halogenide, for example aluminum trichloride can be used.

Acid halogenides and pyrazolidine are dissolved in an inert solvent to which aluminum halogenide is added and then the solution is heated. In this way acyl-derivatives in position 4 of the pyrazolidine are formed which show a strong analgesic and antipyretic activity.

The following examples describe but do not limit the present invention:

Example 1

4.7 g. of 1-2-diphenyl-3,5-dioxo-pyrazolidine and 1.58 g. of acetyl-chloride, in 20 cc. of pyridine, are refluxed for an hour at 120° C. The solution is poured in ice and extracted with ethyl acetate. After washing the solution is concentrated and crystallized from acetic acid. The product is the 4-acetyl-1,2-diphenyl-3,5-dioxo-pyrazolidine (M. 268–270° C.) (dec.).

Example 2

In a solution of 6.37 g. of butyryl-chloride, in 100 cc. of carbon sulfide, 15 g. of 1,2-diphenyl-3,5-dioxo-pyrazolidine are suspended and 12 g. of aluminum chloride are added little by little.

The solution is heated for 4 hours on steam bath. The carbon sulfide is decanted and the reaction product is decomposed with water and hydrochloric acid. The solution is extracted with ether, concentrated and the residue is crystallized from ethylic ether and petroleum ether. The product is the 4-butyryl-1,2-diphenyl-3,5-dioxo-pyrazolidine (M. 93–95° C.).

Example 3

In a solution of 6.37 g. of isobutyryl-chloride, in 100 cc. of carbon sulfide, 15 g. of 1,2-diphenyl-3,5-dioxo-pyrazolidine are suspended and 12 g. of aluminum chloride are added according to Example 2. The product is the 4-isobutyryl-1,2-diphenyl-3,5-dioxo-pyrazolidine (M. 85–90° C.).

We claim:

1. Process for the preparation of compounds of the formula

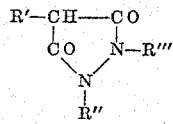

wherein R′ is an alkanoic carboxylic acid acyl group containing 2 to 4 carbon atoms and R″ and R‴ are phenyl, which comprise reacting an alkanoic carboxylic acid halogenide containing from 2 to 4 carbon atoms with the corresponding 3,5-dioxopyrazolidine by means of the Friedel-Crafts reaction.

2. Process as defined in claim 1 wherein the pyrazolidine is 1,2-diphenyl-3,5-dioxopyrazolidine.

3. 4-butyryl-1,2-diphenyl-3,5-dioxopyrazolidine.

4. 4-isobutyryl-1,2-diphenyl-3,5-dioxopyrazolidine.

5. Compounds of the formula

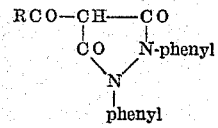

wherein R is alkyl of 1 to 3 carbon atoms.

References Cited in the file of this patent

UNITED STATES PATENTS 2,562,830    Stenzl ------------------ July 31, 1951

FOREIGN PATENTS 506,891    Belgium ---------------- Nov. 3, 1951